(12) United States Patent
Bai et al.

(10) Patent No.: US 9,104,989 B2
(45) Date of Patent: Aug. 11, 2015

(54) PRIORITY AND COST BASED DEADLOCK VICTIM SELECTION VIA STATIC WAIT-FOR GRAPH

(75) Inventors: Yuxi Bai, Kirkland, WA (US); Alexandre Olegovich Verbitski, Woodinville, WA (US); Ming-Chuan Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1381 days.

(21) Appl. No.: 12/272,312

(22) Filed: Nov. 17, 2008

(65) Prior Publication Data

US 2010/0125480 A1    May 20, 2010

(51) Int. Cl.
- *G06Q 10/06* (2012.01)
- *G06F 9/52* (2006.01)

(52) U.S. Cl.
CPC .............. *G06Q 10/06* (2013.01); *G06Q 10/063* (2013.01); *G06F 9/52* (2013.01); *Y10S 707/00* (2013.01)

(58) Field of Classification Search
CPC .................................. G06Q 10/06; G06F 9/52
USPC .......................................................... 705/7.11
See application file for complete search history.

(56) References Cited

U.S. PATENT DOCUMENTS

| | | | |
|---|---|---|---|
| 5,459,871 A * | 10/1995 | Van Den Berg | 718/104 |
| 5,664,088 A | 9/1997 | Romanovsky et al. | |
| 5,682,537 A * | 10/1997 | Davies et al. | 710/200 |
| 5,764,976 A | 6/1998 | Hsiao | |
| 5,835,766 A | 11/1998 | Iba et al. | |
| 5,961,599 A * | 10/1999 | Kalavade et al. | 709/224 |
| 6,223,200 B1 * | 4/2001 | Barnes et al. | 718/100 |
| 6,304,938 B1 | 10/2001 | Srivastava | |
| 6,336,204 B1 * | 1/2002 | Jevtic | 700/121 |
| 6,807,540 B2 * | 10/2004 | Huras et al. | 719/317 |
| 7,185,339 B2 * | 2/2007 | Srivastava et al. | 718/104 |
| 7,355,975 B2 * | 4/2008 | Liu et al. | 370/235 |
| 7,783,610 B2 * | 8/2010 | Lin et al. | 707/689 |
| 7,783,806 B2 * | 8/2010 | Nir-Buchbinder et al. | 710/200 |
| 7,929,460 B2 * | 4/2011 | Chen et al. | 370/255 |
| 2003/0028638 A1 * | 2/2003 | Srivastava et al. | 709/225 |
| 2004/0068501 A1 * | 4/2004 | McGoveran | 707/8 |

(Continued)

OTHER PUBLICATIONS

"Deadlock Detection in Distributed Object Systems", Nima Kaveh and Wolfgang Emmerich, Department of Computer Science, University College London, Gower Street, London WC1 E 6BT, UK, http://www.cs.ucl.ac.uk/staff/w.emmerich/publications/ESEC01/ModelChecking/index.html; Aug. 8, 2001.*

(Continued)

*Primary Examiner* — Justin M Pats
*Assistant Examiner* — Pan Choy
(74) *Attorney, Agent, or Firm* — Henry Gabryjelski; Kate Drakos; Micky Minhas (57) ABSTRACT

Systems and methods that enable resolving deadlock cycles by victim selection based on cost and/or priority of strongly connected components in a static wait-for graph. As such, victims can be selected by iteratively estimating total deadlock resolution cost (based on cost of strongly connected components) for remaining deadlock participants, selecting the participant with the least estimated total cost as the next victim, and reducing the wait-for graph after removing the victim vertex. The victim selection algorithm can be a cost-based greedy algorithm, wherein during each victim selection iteration, a single optimal victim is selected based on estimated remaining cost.

20 Claims, 10 Drawing Sheets

(56) References Cited

U.S. PATENT DOCUMENTS

| | | | |
|---|---|---|---|
| 2005/0091025 A1* | 4/2005 | Wilson et al. | 703/16 |
| 2005/0138200 A1* | 6/2005 | Liu et al. | 709/238 |
| 2007/0106667 A1* | 5/2007 | Jain et al. | 707/8 |
| 2007/0294217 A1* | 12/2007 | Chen et al. | 707/2 |
| 2008/0282244 A1* | 11/2008 | Wu et al. | 718/100 |

OTHER PUBLICATIONS

"Deadlock Resolution and Semantic Lock Models in OO Distributed Systems", by Marina Roesler and Walter A. Burkhard, Department of Computer Science and Engineering. University of California, San Diego, La Jolla, CA 92093; 1998.*

"A Performance Study of Deadlock Resolution in Distributed System", by Chidori Kawamura Boeheim, Ph.D. University of Illinois at Urbana-Champaign, 1991.*

"Stochastic Analysis of Distributed Deadlock Scheduling", by Shigang Chen and Yibei Ling, Department of Computer & Information Science & Engineering. University of Florida; PODC' 05, Jul. 17-20, 2005, Las Vegas, Nevada, USA.*

"Locking and Deadlock Detection in Distributed Databases", by Daniel A. Menasce and Richard R. Muntz, IEEE Transactions on Software Engineering, vol. SE-5, No. 3, May 1979.*

"Deadlock Detection in Distributed Databases", by Edgar Knapp, Department of Computer Sciences, University of Texas at Austin; ACM Computing Surveys, vol. 19, No. 4, Dec. 1987.*

"A Distributed Algorithm for Detecting Resource Deadlocks in Distributed Systems", by K. M. Chandy and J. Misra, Computer Sciences, University of Texan at Austin; 1982.*

"Efficient Deadlock Resolution for Lock-Based Concurrency Control Schemes", by Roesler et al., Department of Computer Science and Engineering, University of California, San Diego. IEEE 1988.*

"Just-in-Time and Just-in-Place Deadlock Resolution", by Fancong Zeng, Graduate Program in Computer Sciences, University of New Jersey; May 2007.*

Soojung Lee, "Fast, Centralized Detection and Resolution of Distributed Deadlocks in Generalized Model", IEEE Transactions on Software Engineering, vol. 30, No. 9, Sep. 2004.*

Lee, et al. A Distributed Algorithm for Deadlock Detection under OR-request Model. http://ieeexplore.ieee.org/iel5/6512/17396/00805109.pdf?tp=&isnumber=&arnumber=805109, 2 pages, last accessed Sep. 11, 2008.

Shkapenyuk, et al. Deadlock Resolution in Pipelined Query Graphs. Mar. 2005. http://nms.csail.mit.edu/~stavros/pubs/deadlock.pdf, 16 pages.

CIS 307: Deadlocks. http://www.cis.temple.edu/~ingargio/cis307/readings/deadlock.html. Last accessed Sep. 11, 2008, 8 pages.

Prabhakaran. Distributed Deadlock Detection. http://www.utdallas.edu/~praba/aos-7-s04.ppt. Last accessed Sep. 11, 2008, 24 pages.

* cited by examiner

PRIORITY AND COST BASED DEADLOCK VICTIM SELECTION VIA STATIC WAIT-FOR GRAPH

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

Transaction processing systems have led the way for many ideas in distributed computing and fault-tolerant computing. For example, transaction processing systems have introduced distributed data for reliability, availability, and performance, and fault tolerant storage and processes, in addition to contributing to a client-server model and remote procedure call for distributed computation.

More importantly, transaction processing introduced the concept of transaction ACID properties—atomicity, consistency, isolation and durability that has emerged as a unifying concept for distributed computations. Atomicity refers to a transaction's change to a state of an overall system happening all at once or not at all. Consistency refers to a transaction being a correct transformation of the system state and essentially means that the transaction is a correct program. Although transactions execute concurrently, isolation ensures that transactions appear to execute before or after another transaction because intermediate states of transactions are not visible to other transactions (e.g., locked during execution). Durability refers to once a transaction completes successfully (commits) its activities or its changes to the state become permanent and survive failures.

Many applications are internal to a business or organization. With the advent of networked computers and modems, computer systems at remote locations can now easily communicate with one another. Such enables computer system applications to be employed between remote facilities within a company. Applications can also be of particular utility in processing business transactions between different companies. Automating such processes can result in significant improvements in efficiency, not otherwise possible. However, this inter-company application of technology requires co-operation of the companies and proper interfacing of the individual company's existing computer systems.

In conventional business workflow systems, a transaction comprises a sequence of operations that change recoverable resources and data from one consistent state into another, and if a deadlock occurs (i.e., multiple actions requiring access to the same resource) before the transaction reaches normal termination, the transactions are canceled to allow the system to restart. This can be extremely costly, both in time and in resources, to a business because all transactions are halted after the deadlock, regardless of their costs. Thus, even if only a single deadlock occurs, the entire system or systems are restarted.

As explained earlier, deadlock refers to a specific condition when two or more processes are each waiting for another to release a resource, or when more than two processes are waiting for resources in a circular chain. Deadlocks do not withdraw on their own accord, and if a deadlock occurs, it must be resolved before additional transactions can be processed. In general, deadlock cycles are resolved one at a time, wherein related algorithms are recursive and yet not efficient when there are multiple connected deadlock cycles in the system. Even after a deadlock is resolved, another deadlock can occur soon afterward.

Moreover, most commercial systems implement timeout-based deadlock resolution strategy. Typically, time-out solutions do not guarantee the existence of deadlocks, and typically cannot guarantee accuracy and correctness of deadlock resolving operation.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation resolves deadlock cycles based on selecting a node candidate(s) for abortion (e.g., a victim selection based on cost and/or priority), in a strongly connected component (SCC) that is derived from reduction of a static wait-for graph. By aborting selected victims from the SCC, subgraphs are generated that are no longer strongly connected. Accordingly, all deadlocks captured by the wait-for graph can be resolved efficiently (e.g., by mitigating permutation analysis) in terms of deadlock resolution cost, such as sum of the cost of the deadlock victim tasks. In general, a strongly connected component represents a graph, wherein there exists a path from each vertex in the graph to every other vertex. Moreover, the strongly connected components—SCC—of a directed graph represent its maximal strongly connected sub-graphs.

According to a related aspect, initially a wait-for graph is constructed having a plurality of subgraphs, which further includes addition subgraphs that are connected or disconnected. From such wait-for graph, subgraphs that are not in a deadlock loop are subsequently removed, and hence the subgraphs that represent deadlocks remain. Subsequent to such graph reduction stage, strongly connected components associated with the wait-for graphs are computed, wherein each strongly connected components represents a path from any vertex to any other vertex and backwards. As such, each strongly connected component can act as a largest loop that contains the vertices (a vertex is associated with a cost, and deadlocks are broken based on an overall cost.) Hence, victim selection can be based on total cost of resolving all deadlocks in the wait-for graph. Put differently, victim selection algorithm can be a cost-based greedy algorithm, wherein in each victim selection iteration, a single optimal victim is selected based on estimated remaining cost (e.g., the unit of cost estimation is a strongly-connected component of the wait-for graph).

In a related methodology, all deadlocks captured in the wait-for graph are examined simultaneously (as opposed to one deadlock cycle at a time), wherein victims can be selected based on estimated total cost (as opposed to using cycles to select a single victim per cycle victims.) Moreover, strongly-connected components in the wait-for graph are used as units for cost estimation.

In a related aspect, initially the subject innovation can define an "n-complex strongly-connected" component (where n is an integer) as a strongly-connected component from which the removal of at most n vertices will yield subgraphs that are no longer strongly connected. Hence, deadlocks can be resolved efficiently with respect to both the total cost of the victim tasks and the computation cost of victim selection.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
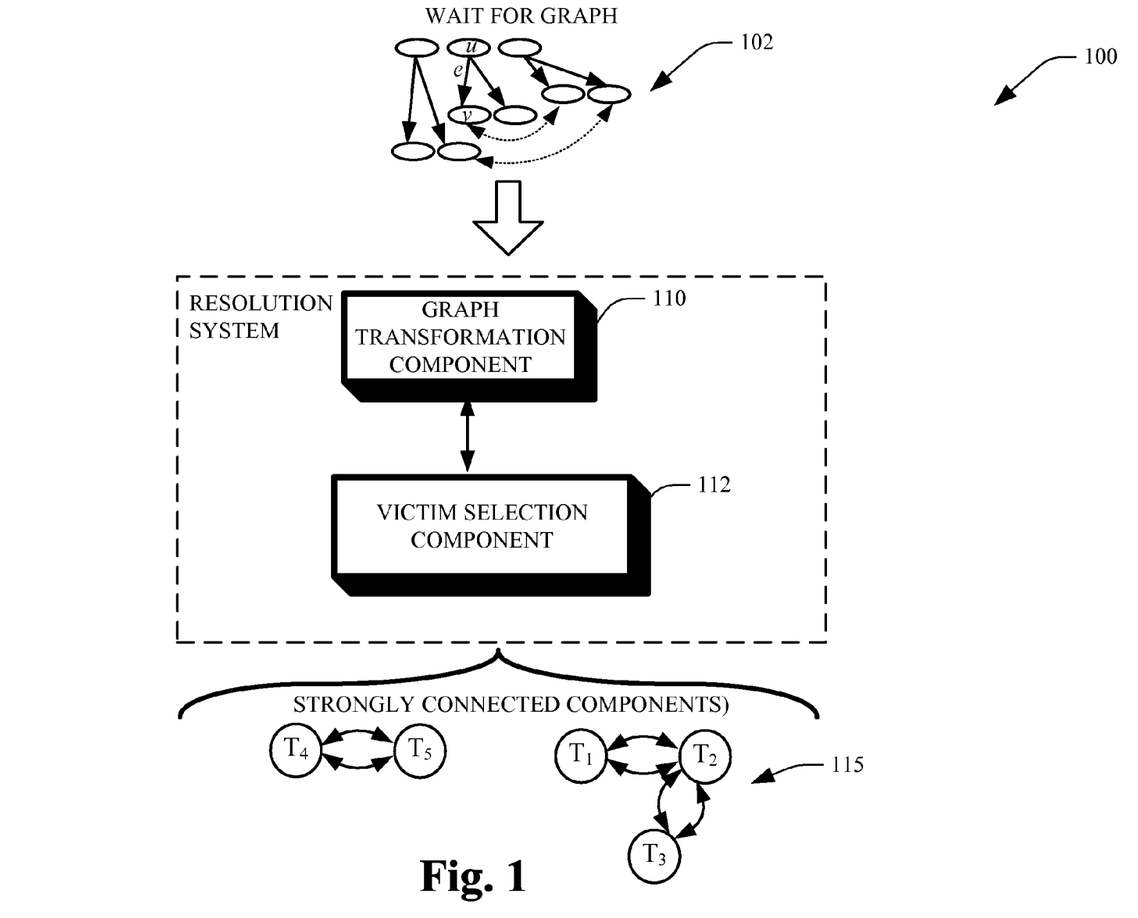
FIG. 1 illustrates a block diagram of a cyclical deadlock resolution system according to an aspect of the subject innovation.

FIG. 1 illustrates a block diagram of a deadlock resolution system 100 that includes a graph transformation component 110 and a victim selection component 112 according to an aspect of the subject innovation. As explained earlier, a deadlock is caused when two or more threads come into conflict over some resource, in such a way that no execution is possible. For example, one common form of deadlock occurs when two or more threads wait for a resource that is owned by the other thread. When such deadlock is detected, the resolution system 100 resolves the deadlock by choosing one of the sessions as a deadlock victim, wherein such victim selection is based on cost and/or priority in a strongly connected component(s) 115 of a static wait-for graph 102. In general, a graph G is represented by G=(V,E), where V (or V(G)) is the set of vertices (or nodes) and E (or E(G)) is the set of edges. An edge e from u to v is denoted by (u,v), and it is called an outgoing edge for u and an incoming edge for v. Node u can reach node v (or equivalently v is reachable from u) if there is a path from u to v in the graph. The notation uv is utilized to denote that v is reachable from u; and n is defined to be the number of vertices of a graph when this is clear from context.

For example, such graph 102 can represent wait-for relations among multiple units of execution (tasks) in a software process. Accordingly, V is the set of vertices, each of which represents a task, and E is the set of edges, each of which represents a wait-for relation between a pair of two tasks. Moreover, each vertex can be associated with a cost given by the function C(v), representing the cost of selecting the corresponding task as a deadlock victim.

In one aspect, there can exist two types of wait-for relations: wait-for-all and wait-for-any. The former represents a scenario in which the waiting task cannot make progress until all of its outgoing waits disappear. Likewise, the latter represents a scenario in which the waiting task can make progress as soon as one of its outgoing waits disappears. The resolution system 100 can resolve all deadlocks captured by the wait-for graph efficiently in terms of deadlock resolution cost (sum of the cost of deadlock victim tasks).

Moreover, and as illustrated in FIG. 1, the deadlock resolution system 100 can identify deadlock cycles and analyze one or more data structures that store information concerning running threads, waiting threads to determine whether a deadlock exists. The resolution system 100 is further operable to perform one or more methods that can be employed to resolve a deadlock, providing advantages over conventional systems. The graph transformation component 110 manipulates the wait-for graph 102 such that by end of its processing, the remaining vertices/edges are in deadlocks, and the SCC(s) are hence computed. Put differently, the graph transformation component 110 reduces the wait-for graph, wherein by reducing the wait-for graph, the subgraphs that do not participate in the deadlocks are removed.

Likewise, the victim selection component 112 can traverse a wait for graph or strongly connected component and/or add and/or remove arcs and/or nodes therefrom to facilitate resolving a deadlock, by selecting a node candidate for abortion (e.g., a victim selection based on cost and/or priority), in a strongly connected component(s). In general, a strongly connected component 115 represents a subgraph, wherein there exists a path from each vertex in the subgraph to every other vertex. Moreover, the strongly connected components—SCC—of a directed graph represents its maximal strongly connected sub-graphs.

Figure 2:
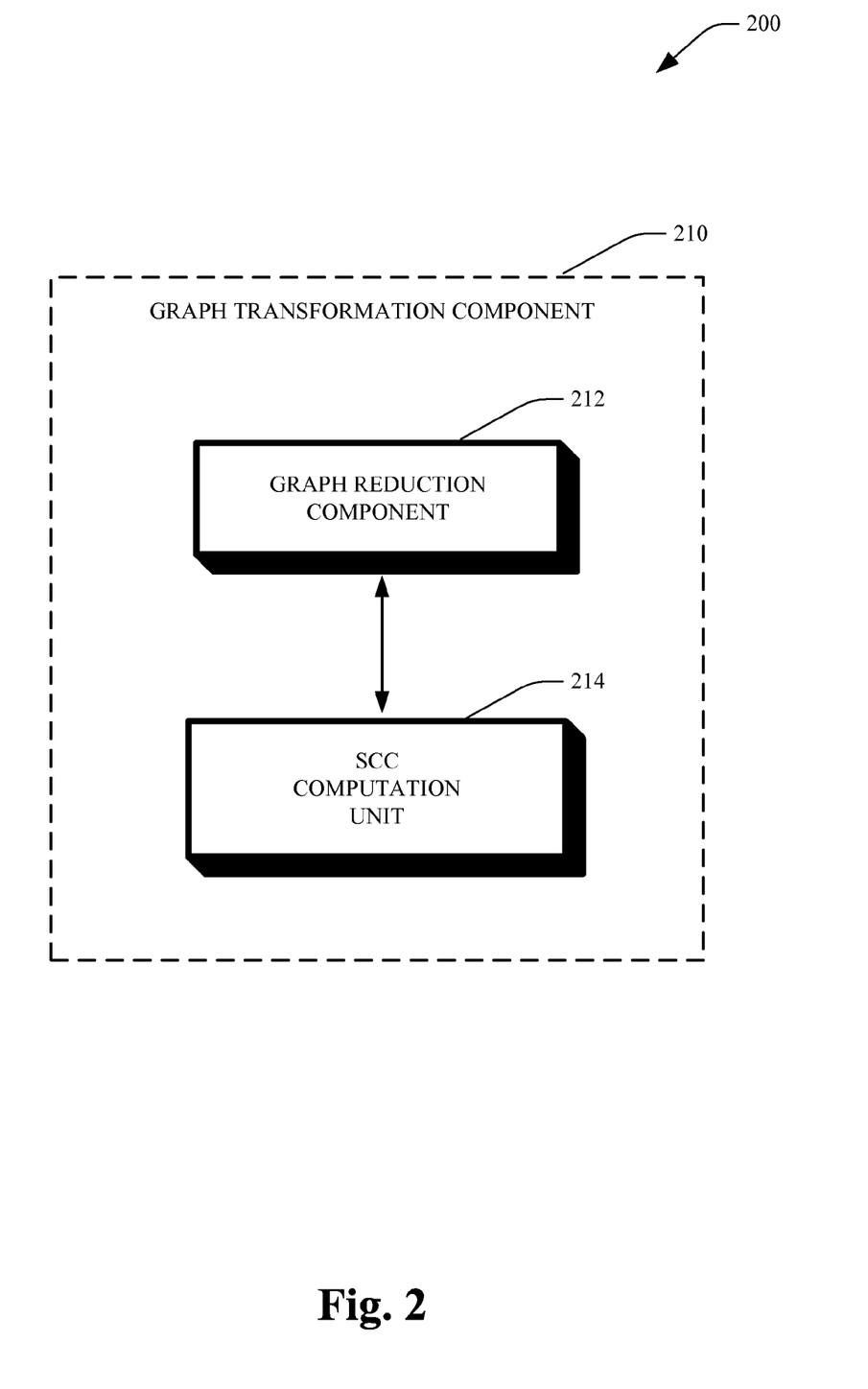
FIG. 2 illustrates a particular graph transformation component that employs strongly connected components to resolve deadlocks.

FIG. 2 illustrates a graph transformation component 210 that further includes a graph reduction component 212 that reduces a generated wait-for graphs and a strongly connected component (SCC) computation unit 214, which computes strongly connected components. As such, the victim selection depends on two procedures namely: graph reduction via the reduction component 212 and strongly connected component computation 214, via the SCC computation unit. Graph reduction is an iterative procedure, wherein each iteration attempts to remove vertices and edges from the graph that definitely cannot participate in deadlock. The iteration continues until no additional vertices or edges can be removed from the graph, and hence the graph becomes stable.

Such strongly-connected component computation is based on well-know algorithm. Typically, aspects of the subject innovation address how SCCs are employed in cost estimation, wherein one can compute strongly-connected components only once per wait-for graph. It can be assumed that subsequent graph reductions can only remove vertices from existing strongly-connected components, and not to split any one strongly-connected component into multiple strongly-connected components. Such is practical because one rarely observes wait-for graphs in which the number of edges greatly exceeds the number of vertices. In one aspect, the victim selection algorithm is essentially a cost-based greedy algorithm. In each victim selection iteration, the system 200 attempts to select a single optimal victim based on estimated remaining cost. The estimated remaining cost for selecting a particular vertex, $v_i$, as the next deadlock victim can be represented as $C(v_i)$ plus the estimated cost of resolving remaining deadlocks after removing $v_i$ from the wait-for graph.

Moreover, removing $v_i$ from the wait-for graph requires graph reduction, in case the removal of $v_i$ unblocks other vertices. It is to be appreciated that before $v_i$ is confirmed to be the next deadlock victim, changes to the wait-for graph can be considered transient and temporary (including graph reduction). For example, after temporarily removing $v_i$ and reducing the graph, the estimated cost for resolving all remaining deadlocks is simply the sum of the costs of the lowest-cost vertex in each remaining strongly-connected component. In each victim selection iteration, the above estimation is performed for each remaining vertex, and the vertex with the lowest estimated cost is chosen as the next deadlock victim. After a vertex is confirmed to be the next deadlock victim, it is permanently removed from the wait-for graph, and the graph is then reduced permanently. Such process continues until the wait-for graph is empty (does not contain any deadlock).

In another aspect, not all vertices have associated cost, wherein if a vertex does not have associated cost, it indicates the associated task cannot be chosen as a deadlock victim. According to a further aspect, one does not consider these vertices as potential victims. In Structured Query Language (SQL) Server, each vertex has a complex cost function, wherein the cost of a vertex depends on both the priority and the amount of log used by the associated task. Moreover, priority has precedence over log used, and the implementation groups potential deadlock victim vertices by priority, and in each victim selection iteration, only the group of vertices with the lowest priority.

Figure 3:
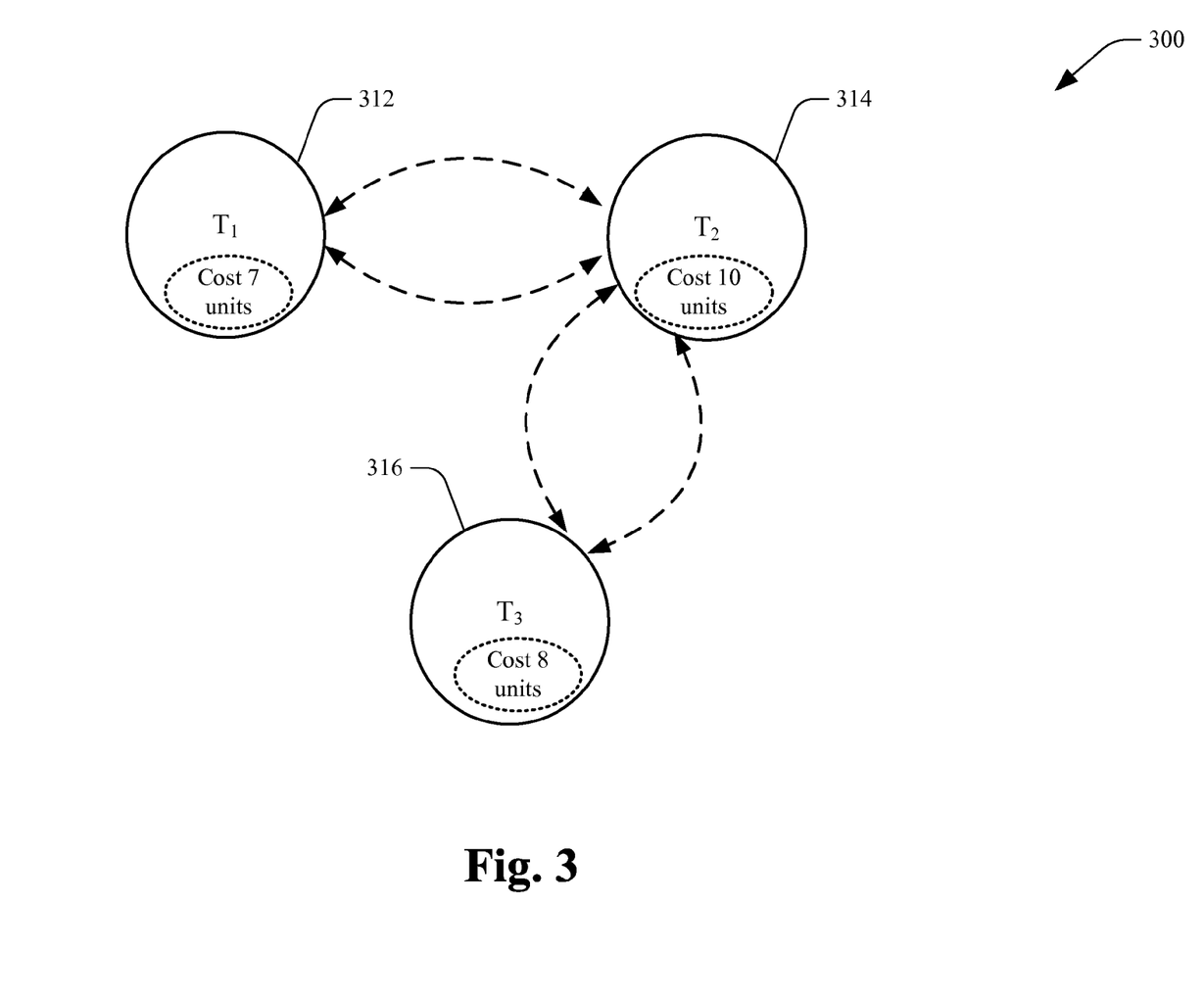
FIG. 3 illustrates a particular resolution of a cyclical deadlock based on cost calculation for a strongly connected component according to an aspect of the subject innovation.

FIG. 3 illustrates a particular resolution of a cyclical deadlock based on cost calculation for a strongly connected component according to an aspect of the subject innovation. Victim selection is based on cost estimation units, wherein each strongly connected component has a unit of cost associated therewith. As such, the total minimum cost to resolve all deadlocks and hence eliminate the strongly connected components in the graph can be determined. Such can be performed by obtaining optimal result via an approximation and hence not mitigating a requirement of iterating through scenarios of selecting all nodes and computing the associated costs. As illustrated in FIG. 3, the system 300 presents a strongly connected component, wherein for such particular scenario it can be assumed that the priority remains the same for all three tasks, and hence deadlocks can be resolved based on minimum costs.

In ascending order, the level of cost is $T_1$, $T_3$, $T_2$, ("7" units, "8" units, "10" units) and the cost of the strongly component 300 ($T_1$, $T_2$, $T_3$) is the cost of the task with minimum cost in such component and hence "7". Initially, $T_1$ can be assumed to be the victim, and upon aborting such task, tasks $T_2$ and $T_3$ will remain. Hence, the total remaining cost is represented by the minimum of $T_2$, $T_3$, which is 8, and the total cost is the cost of elimination of the strongly connected component is $T_1+T_3$; namely; 7+8=15. Likewise, the next task in the sorted list is $T_3$, based on cost estimation. As such, the total cost of aborting $T_3$ is the cost of $T_3$ ("8") plus a loop between $T_1$ and $T_2$, which is "7" (cost of minimum node in the closely connected loop of $T_1$ and $T_2$), resulting in "8"+"7"=15. The final estimation is for aborting $T_2$ (having a cost of "10") plus cost of the remaining strongly connected component ($T_1$ and $T_3$; which is zero, since such graph becomes empty after this reduction.) After removing $T_2$ both loops are removed and hence no strongly connected component exists, thus providing the least amount of cost as "10". According, the victim selected is $T_2$.

Figure 4:
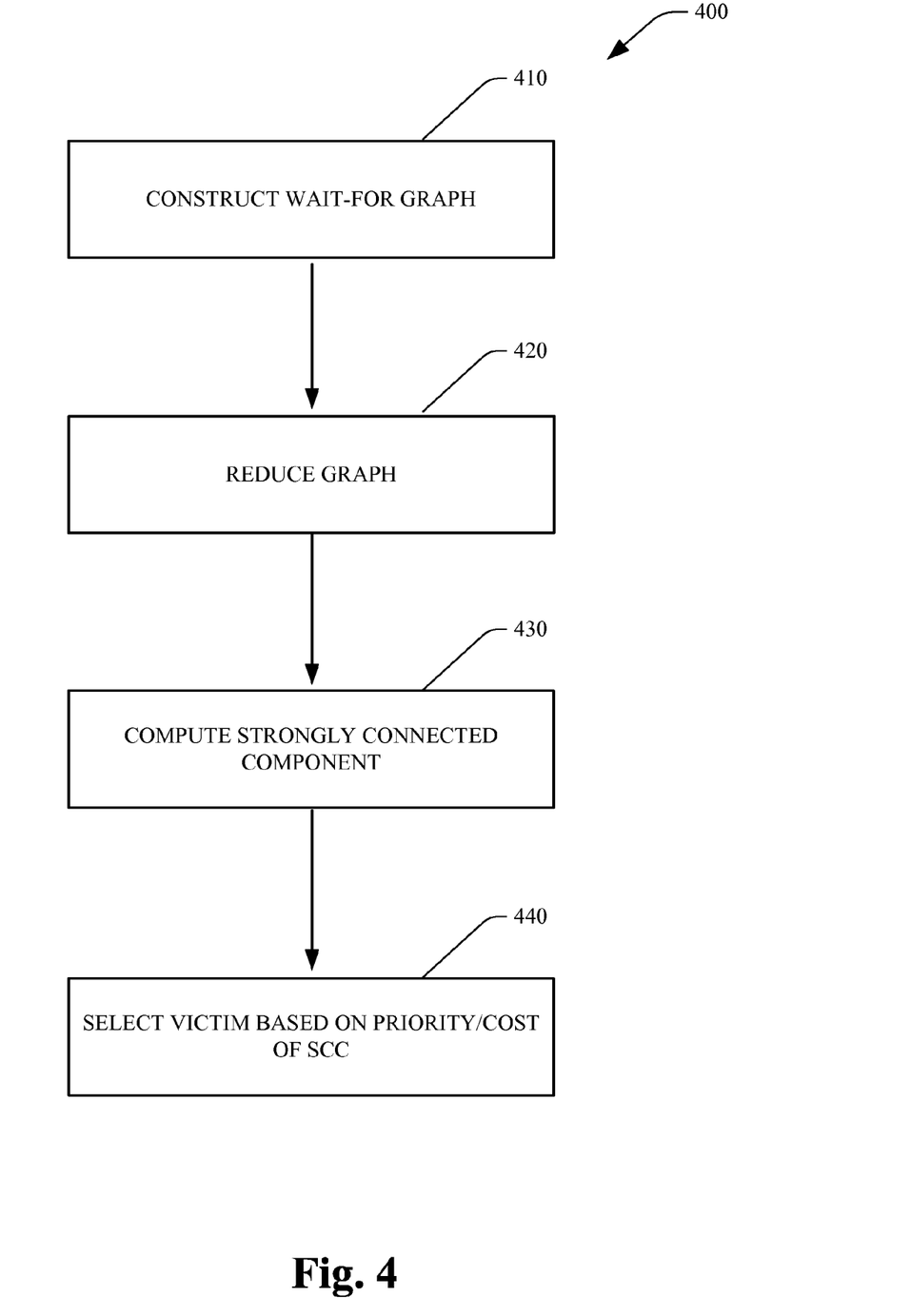
FIG. 4 illustrates a related methodology of resolving a deadlock cycle based on selecting a node candidate for abortion in a strongly connected graph according to an aspect of the subject innovation.

FIG. 4 illustrates a related methodology 400 of selecting a node candidate for abortion in a wait-for graph based on a strongly connected component according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. According to the methodology 400, initially and at 410 wait-for graph is constructed having a plurality of subgraphs, which further includes subgraphs that are connected or disconnected. From such wait-for graph, subgraphs that are not in a deadlock loop are subsequently removed at 420, and the loops that represent deadlocks remain. Subsequent to such graph reduction stage 420, strongly connected components associated with the wait-for graphs are computed at 430, wherein each strongly connected components represents a path from a vertex to another vertex and backwards.

As such, each strongly connected component can act as a largest loop that contains the vertices (a vertex is associated with a cost, and deadlocks are broken based on an overall cost.) Hence, victim selection can be based on total cost of resolving all deadlocks in the wait-for graph at 440. Put differently, victim selection algorithm can be represented by a cost-based greedy algorithm, wherein in each victim selection iteration, a single optimal victim is selected based on estimated remaining cost (e.g., the unit of cost estimation is a strongly-connected component of the wait-for graph). As such, the victim can be removed and the cycle deadlock resolved.

Figure 5:
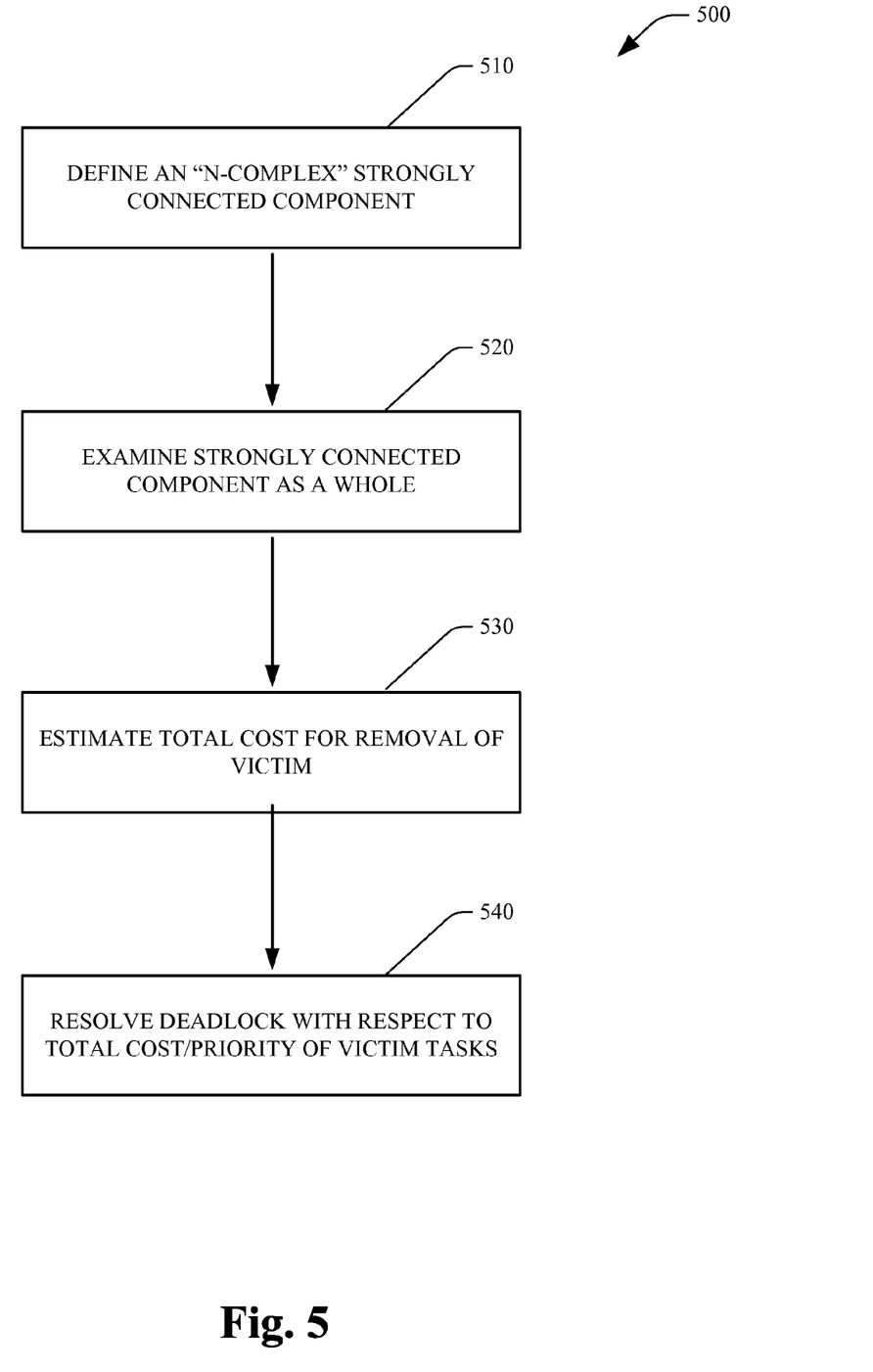
FIG. 5 illustrates a further methodology of resolving deadlocks according to a further aspect.

FIG. 5 illustrates a further methodology 500 of resolving deadlocks according to a further aspect. Initially and at 510 a "n-complex strongly-connected" component (where n is an integer) is defined, from which the removal of at most n vertices will yield sub-graphs that are no longer strongly connected. Subsequently and at 520, the strongly connected component can be examined as a whole, (as opposed to one deadlock cycle at a time), wherein victims can be selected based on estimated total cost at 530 (as opposed to detecting cycles in the graph or using cycles to select victims.) As such, all deadlocks captured in the wait-for graph are examined simultaneously, wherein strongly-connected components in the wait-for graph are used as units for cost estimation. Accordingly, all deadlocks captured by the wait-for graph can be resolved efficiently (e.g., by mitigating permutation analysis) in terms of deadlock resolution cost, such as sum of the cost of the deadlock victim tasks.)

Figure 6:
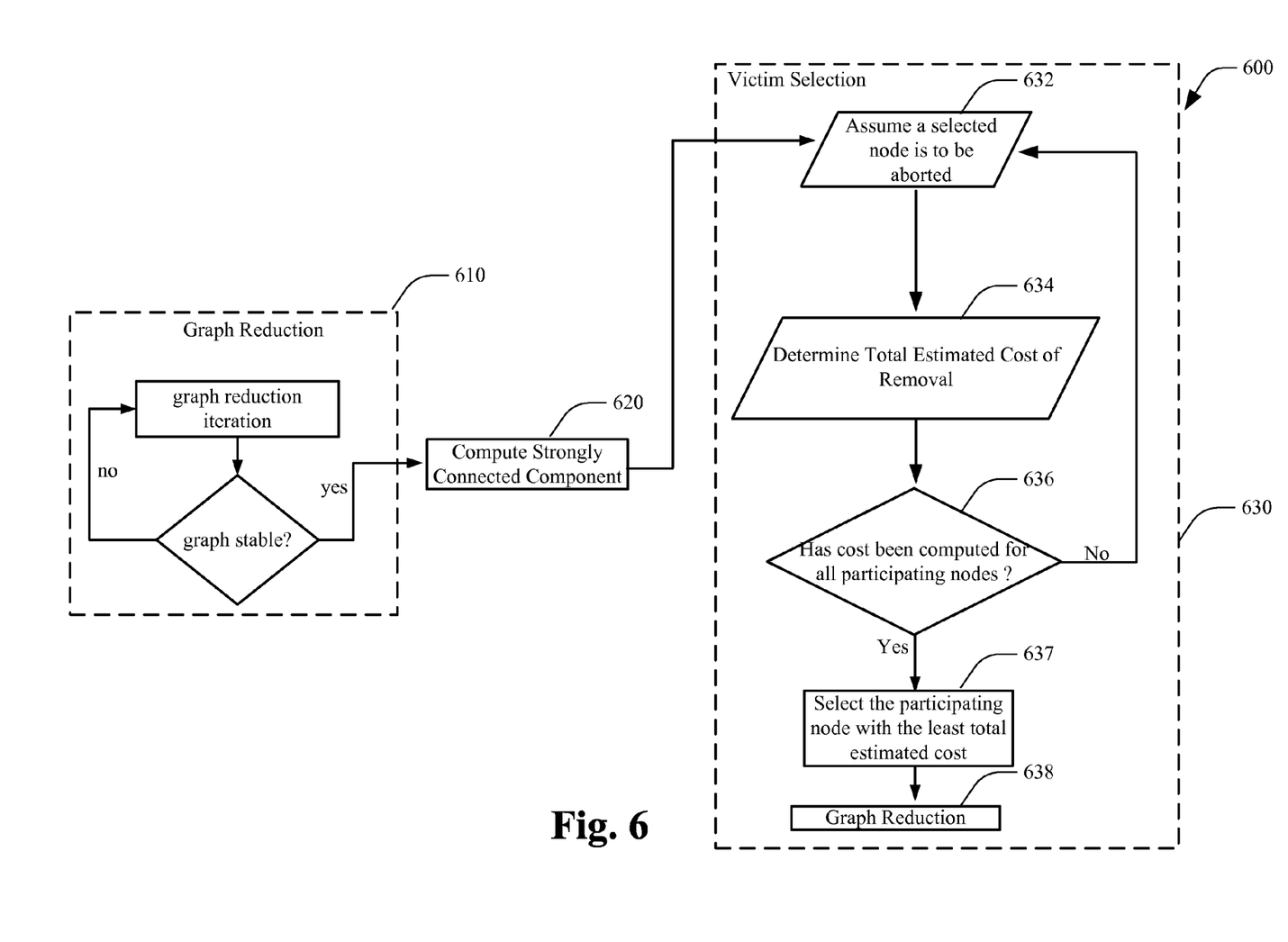
FIG. 6 illustrates a related methodology of deadlock resolution in accordance with an aspect of the subject innovation.

FIG. 6 illustrates a related methodology 600 of deadlock resolution in accordance with an aspect of the subject innovation. As explained earlier, the methodology 600 includes three phases namely; a graph reduction 610, a computation stage of strongly connected components 620 and a victim selection stage 630. The graph reduction stage 610 can further include a graph reduction iteration and verification of graph stability. If the graph reduction iteration performs any changes (e.g., removal of nodes and edges) to the wait-for graph reduction, such graph is considered unstable. From such wait-for graph, subgraphs that are not in a deadlock loop are subsequently removed, and hence the loops that represent deadlocks remain. The process 610 is iterated until the remaining vertices and edges are in deadlock.

Likewise, and at 620 strongly connected components can be computed. Such strongly connected component represents a graph, wherein there exists a path from each vertex in the graph to every other vertex, and its maximal strongly connected sub-graphs. At 630, victim selection phase can be performed wherein such victim selection algorithm can be a cost-based greedy algorithm. In such victim selection phase 630, a node having a cost of $C(v_i)$ can then be selected at 632 and considered for abortion. Such node can then be assumed to be removed from the SCC at 634 and associated total cost can be estimated, namely cost of removal of selected node and the remaining nodes. The total cost can be represented by $C(v_i) + \Sigma C(v_j)$, wherein, $v_j$ is the lowest-cost vertex in each remaining strongly-connected component.

In each victim selection iteration, a single optimal victim is selected based on estimated remaining cost (e.g., the unit of cost estimation is a strongly-connected component of the wait-for graph). At 636, a determination is made whether costs have been computed for all nodes, and if so, by selecting the participating node with the least total estimated costs at 637, the graph can be reduced at 638.

In one aspect, the vertices in the Local Wait For Graph (LWFG) that are not excluded from victim selection, are sorted by priority (low to high) and log size (low to high), and then grouped by priority. The LWFG can consist of a set of vertices, a set of edges, and a set of SCCs. In the context of resolution system, each vertex represents the tuple (search index, task progress mark), and each edge represents the wait-for relationship between two vertices. The grouping enforces the deadlock resolution policy that the resolution system should typically not abort a higher priority task while allowing a lower priority task to continue execution when both tasks are deadlock participants. As explained earlier, estimated total deadlock resolution cost for selecting vertex $v_i$ as a victim can be computed at as log size of $v_i + \Sigma_{k=1 \ldots n}$ (log size of $v_{min\_k}$), where $v_{min\_k}$ is the lowest costing vertex in the kth SCC' of the reduced sub-graph (SCC–$v_i$), and n is the number of SCCs (where i, k, n are integers) An SCC's can be computed by first running graph reduction, and then removing reduced vertices and edges from the original SCC. Lowest costing vertex can be defined as a vertex with the lowest log size in the set of vertices that have the lowest priority. It is to be appreciated that there can exist multiple lowest cost vertices in a given set of vertices. In this case, the resolution system can use the cost of any one of these cost-equivalent vertices. A simple SCC (e.g., a zero-complex) can be defined such that there is no sub-SCC in the sub-graph (SCC–v) for all v∈SCC. Define a 1-complex SCC a SCC such that there are only simple sub-SCCs in the sub-graph (SCC–v) for all v∈SCC. Define a n-complex (n≥2) SCC as a SCC such that there is at least one (n–1)-complex sub-SCCs in the sub-graph (SCC–v) for all v∈SCC.

Such definitions have the following implications:
Actual cost of resolving all deadlocks in a simple SCC if v is selected as a victim=log size of v, ∀v∈SCC.
Actual cost of resolving all deadlocks in a 1-complex SCC if v is selected as a victim=log size of v+$\Sigma_{k=1 \ldots n}$(cost of resolving all deadlocks in k-th sub-SCC)=log size of v+$\Sigma_{k=1 \ldots n}$(log size of minimum cost $v_{min}$ k-th sub-SCC), where n is the number of SCCs in the sub-graph (SCC–v), ∀v∈SCC.

It is to be appreciated that when all SCCs of LWFG' are simple or 1-complex that contain only a single simple SCC in (SCC–v) ∀v∈SCC, the estimated total deadlock resolution cost computed using the suggested heuristics is the actual total cost. On the other hand, if a SCC is 1-complex that contains 2 or more SCCs in (SCC–v) ∀v∈SCC, or the SCC is n-complex (n≥2), actual cost of resolving all deadlocks in a 1-complex SCC if v is selected as a victim≠log size of v+$\Sigma_{k=1 \ldots n}$(log size of minimum cost $v_{min}$ in k-th sub-SCC), where n is the number of SCCs in the sub-graph (SCC–v), ∀v∈SCC. Since each of the k sub-SCCs of (SCC–v) are at least 1-complex, and further applications of Kosaraju's algorithm are required to determine their sub-sub-SCCs, sub-sub-sub-SCCs, and so on, until all remaining SCCs are either simple or 1-complex, in order to determine the actual deadlock resolution cost. The runtime complexity of such a solution is too high to be practical. It is to be appreciated that the above discussion represents a particular scenario for applying heuristics and the subject innovation is not so limited.

In one aspect, for Wait for graphs WFGs that contain only simple and 1-complex SCCs (with the condition that (SCC–v) ∀v∈SCC has a single SCC), the subject innovation can further yield an efficient solution for deadlock victim set. It is to be appreciated that further aspects can constrain the design further to make the deadlock resolution strategy optimal for all 1-complex SCCs (without condition). Such typically requires the resolution system to use Kosaraju algorithm to compute the actual remaining SCCs after graph reduction for every cost estimation.

Figure 7:
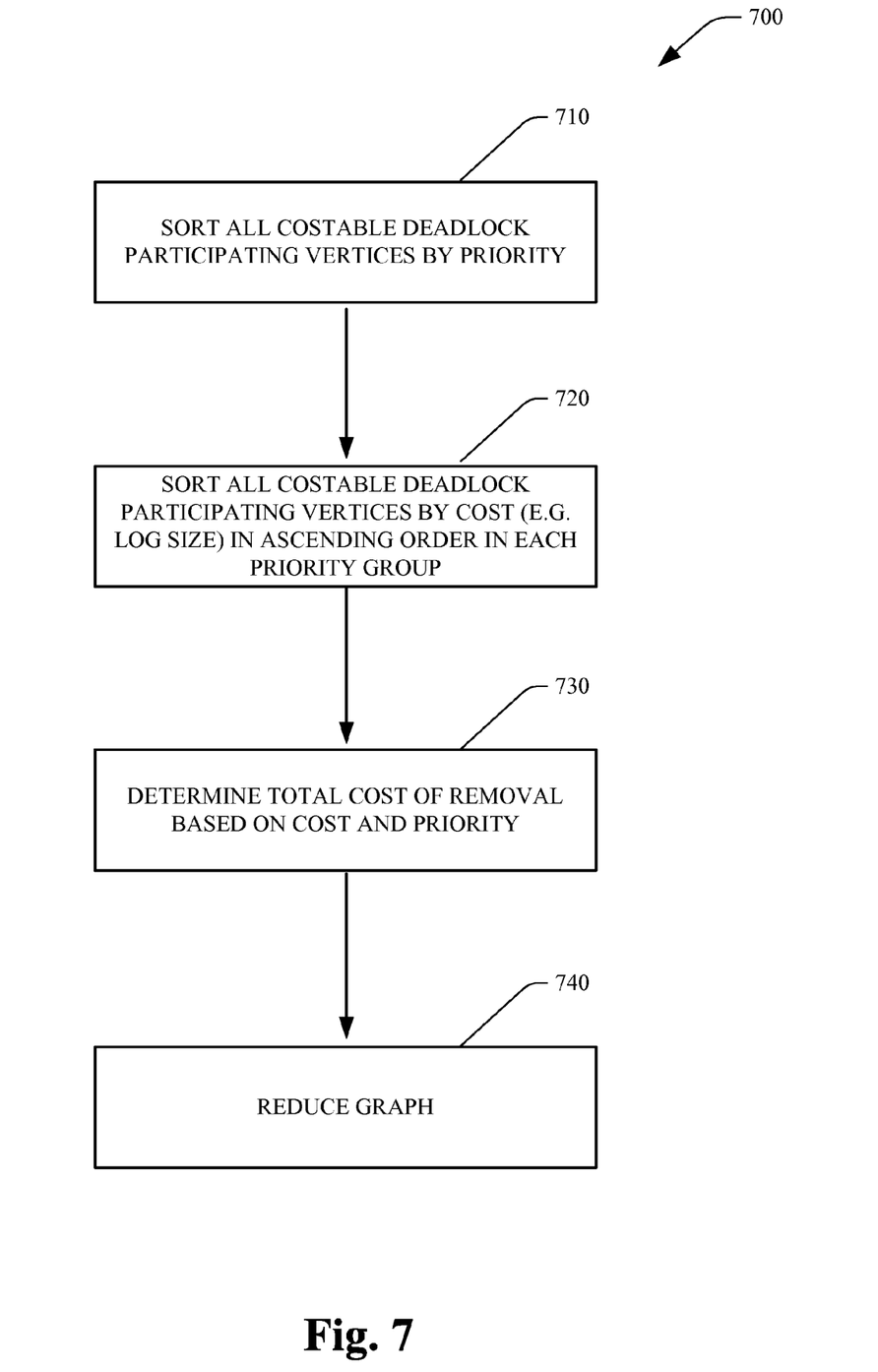
FIG. 7 illustrates a deadlock victim selection and resolution process according to a further aspect.

FIG. 7 illustrates an exemplary methodology 700 that reduces a wait-for graph based on cost and priority. As indicated by acts 710, and 720 priority takes precedence over cost (e.g. log size) for costable deadlocks. By examining one priority group at a time, the subject innovation can typically ensure that no higher priority task is selected as deadlock victim until all lower priority tasks are either chosen as deadlock victim or removed from the graph due to the selection of other victims. At 730, total cost of removal can be determined based on cost and priority, and graph reduced at 740.

Moreover, and as explained in detail infra, heuristically, one can assume that the SCCs of (G–$v_i$) is the same as the SCCs of G, unless the previous permanent graph reduction has removed all vertices/edges in an SCC. In general, if the vertex with the lowest cost in an SCC is removed due to graph reduction, and hence the cost of the SCC changes. Otherwise, the cost of the SCC remains unchanged.

Figure 8:
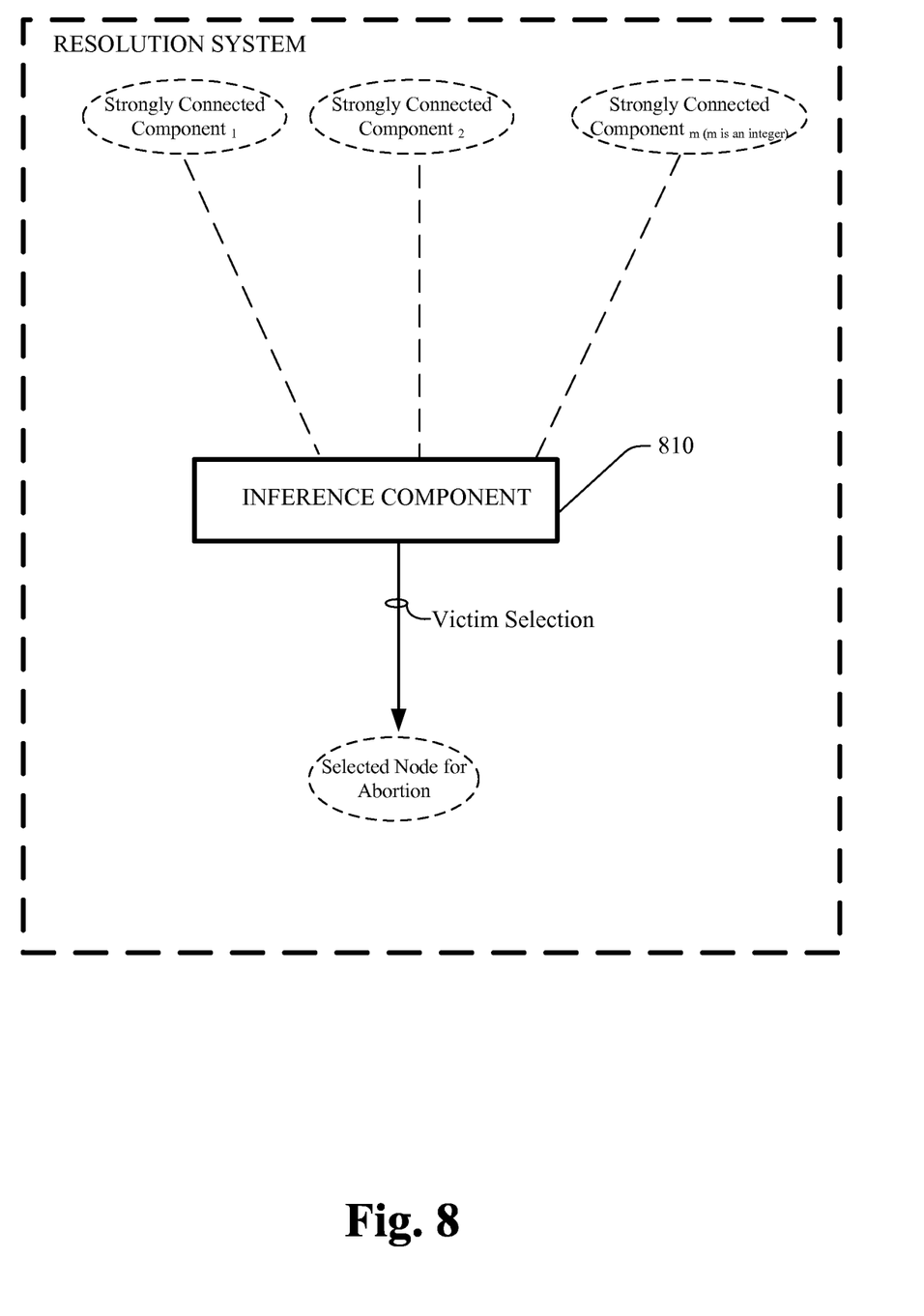
FIG. 8 illustrates an inference component that can facilitate selection of a node according to an aspect of the subject innovation.

FIG. 8 illustrates an inference component 810 that can facilitate victim selection in a strongly connected component(s) of a static wait-for graph, for resolving deadlock cycles. For example, such can include supplying heuristics for cost estimation associated with victim selection. In a related aspect, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 810 can employ any of a variety of suitable AI-based schemes as described supra in connection with facilitating various aspects of the herein described invention. For example, a process for learning explicitly or implicitly when to embed origination information in data records, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

As used in herein, the terms "component," "system", "module" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
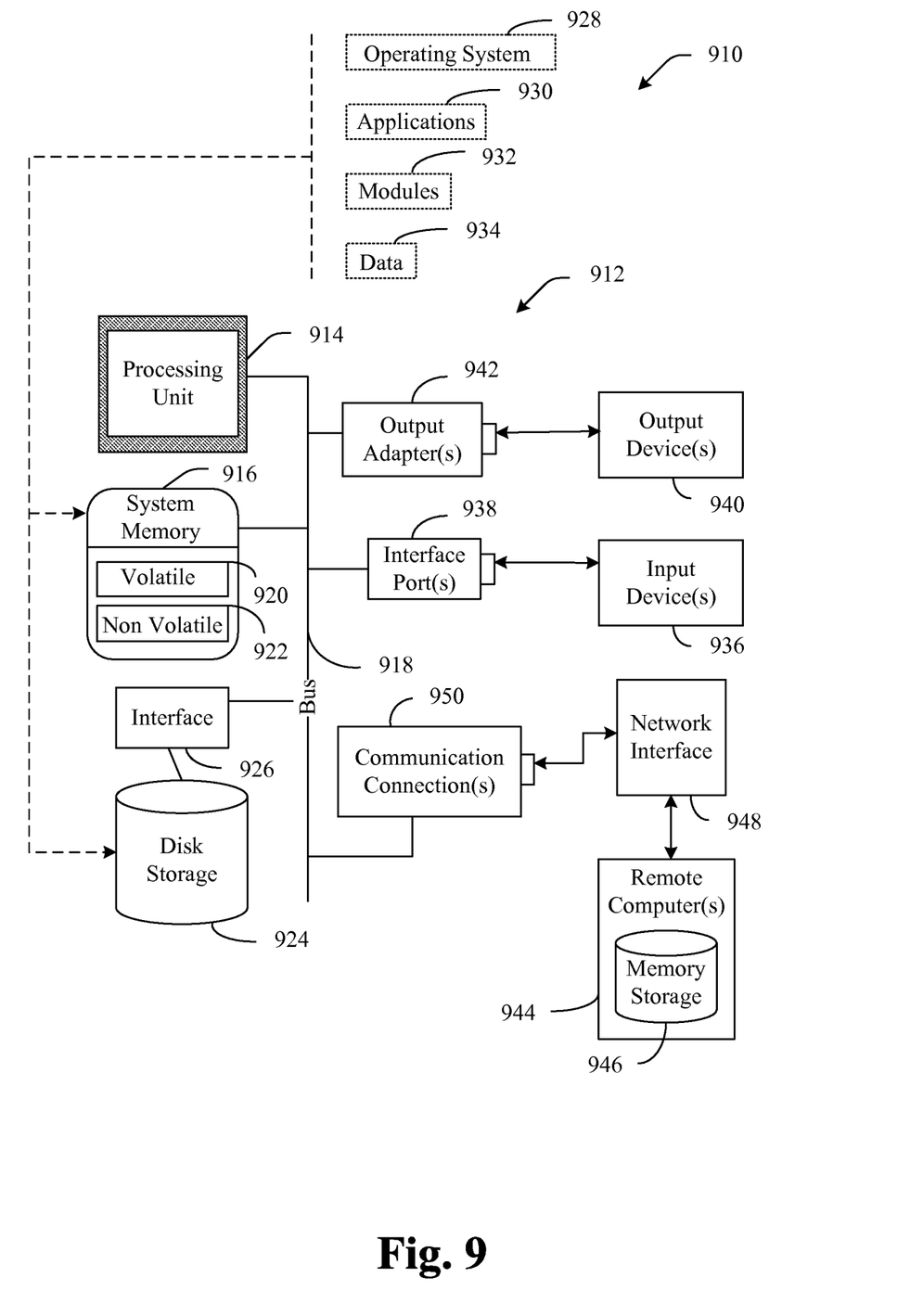
FIG. 9 is a schematic block diagram of a sample-computing environment that can be employed as part of resolving deadlocks in accordance with an aspect of the subject innovation.
Figure 10:
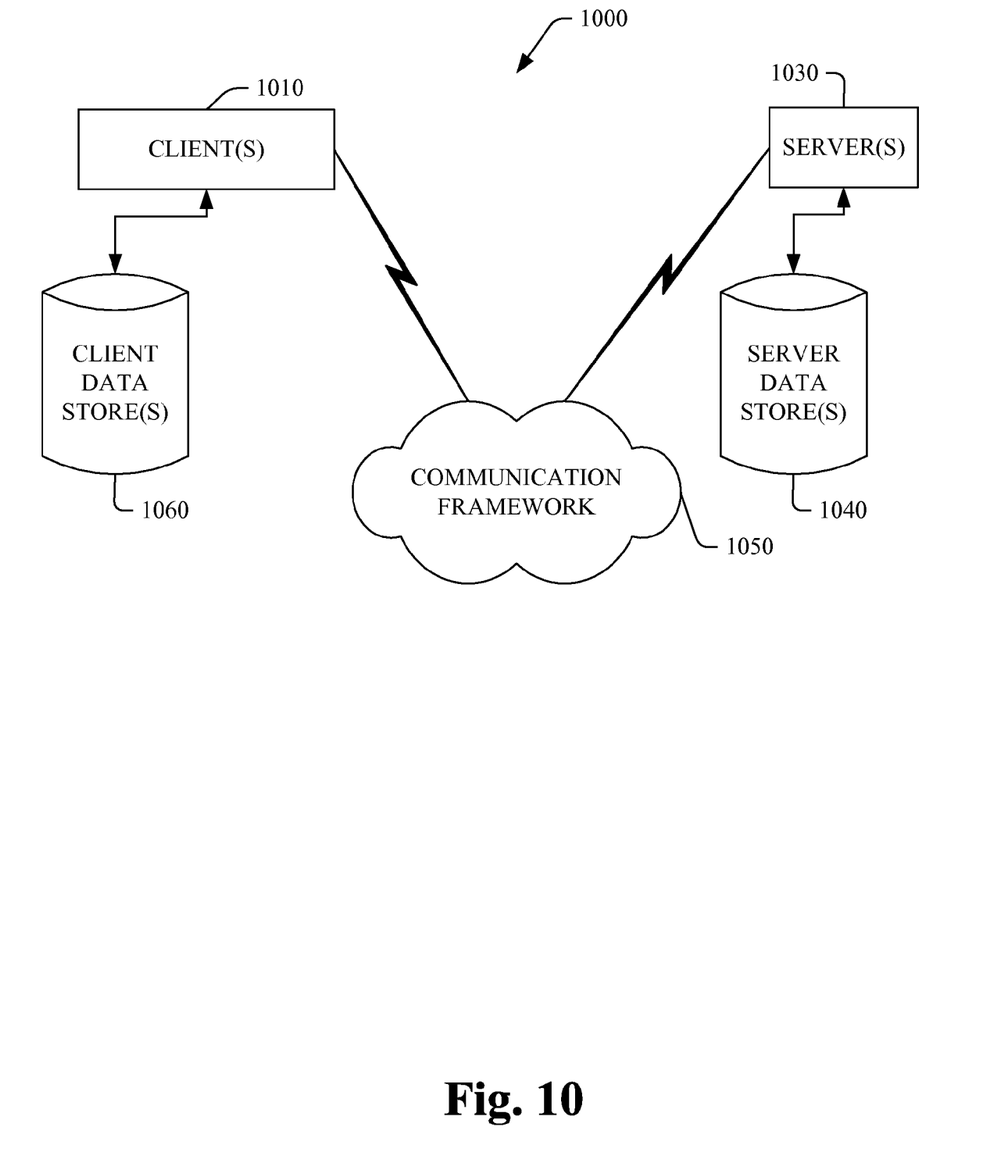
FIG. 10 illustrates an exemplary environment for implementing various aspects of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of resolving deadlocks in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system for efficiently resolving deadlocks between two computing threads in computer transaction processing, the system comprising:

at least one processor and at least one computer-readable storage medium storing instructions executable by the at least one processor, a graph transformation component configured to create a strongly connected component (SCC) from a wait-for graph associated with deadlocks between two computing threads in computer transaction processes of a multiprocessor system; and the strongly connected component formed by reducing the wait-for-graph;

a victim node selection component configured to:

identify a deadlock cycle;

resolve deadlock cycles between two computing threads in computer transaction processes of the multiprocessor system via the strongly connected component by executing a greedy algorithm:

until no additional nodes can be removed, iteratively select a victim node based on a combination of priority of the node and removal cost of the node based on an amount of log used by an associated task, and based on assuming that the selected node is removed from the strongly connected component, estimate an associated total cost defined as the removal cost of the selected node and remaining nodes of the strong connected component, wherein in each iteration, a single optimal node is selected for removal based on estimated remaining cost and priority;

remove the selected victim node and remaining nodes based on the estimated total cost and resolve the deadlocks.

2. The computer implemented system of claim 1, the graph transformation component further comprising a graph reduction component configured to remove loops not part of a deadlock cycle.

3. The computer implemented system of claim 1, the graph transformation component further comprising a strongly connected computation (SCC) unit configured to compute cost estimation units associated with victim selection.

4. The computer implemented system of claim 1, the victim selection being based on estimated total costs of victim tasks.

5. The computer implemented system of claim 1, further comprising a component configured to define a strongly-connected component from which removal of a threshold number of vertices will yield sub-graphs that are no longer strongly connected.

6. The computer implemented system of claim 1, the strongly connected component being represented as units for cost estimation.

7. The computer implemented system of claim 1, further comprising an inference component configured to facilitate victim selection.

8. The computer implemented system of claim 1, the strongly connected component representing maximal strongly connected sub-graphs.

9. A computer implemented method for efficiently resolving deadlocks between two computing threads in computer transaction processes, the method comprising using at least one processor to execute instructions stored on a computer-readable storage medium to perform operations comprising:

creating, by the at least one processor, a strongly connected component (SCC) from a wait-for graph associated with deadlocks between two computing threads in computer transaction processes of a multiprocessor system via an SCC computation unit, the strongly connected component formed by reducing the wait-for-graph;

identifying, by the at least one processor, a deadlock cycle;

resolving, by the at least one processor, deadlock cycles among the between two computing threads in computer transaction processes via the strongly connected component by executing a greedy algorithm including selecting, by the at least one processor, a victim node, based on a combination of priority of the node and cost based on an amount of log used by an associated task, for removal from the strongly connected component, assuming that the selected node is removed from the strongly connected component, and based at least partly on the assuming, by the at least one processor, estimating a total cost in terms of the removal cost of the selected node plus a cost of removing remaining nodes of strongly connected component;

removing, by the at least one processor, the selected victim node and remaining nodes based on the estimated total cost and resolving the deadlocks.

10. The computer implemented method of claim 9, further comprising examining the strongly connected component as a whole.

11. The computer implemented method of claim 10, further comprising traversing the strongly connected component to select the victim node.

12. The computer implemented method of claim 10, further comprising verifying stability of the wait-for-graph.

13. The computer implemented method of claim 10, further comprising inferring victim selection via an inference component.

14. The computer implemented method of claim 10, further comprising employing a Kosaraju algorithm to compute actual remaining SCCs after graph reduction for every cost estimation.

15. A computer memory for efficiently resolving deadlocks between two computing threads in computer transaction processes, the computer memory having computer-executable instructions, which when executed perform actions, comprising:

creating, by the at least one processor, a strongly connected component (SCC) from a wait-for graph associated with deadlocks between two computing threads in computer transaction processes of a multiprocessor system via an SCC computation unit, the strongly connected component formed by reducing the wait-for-graph;

identifying a deadlock cycle;

resolving, by the at least one processor, deadlock cycles among the between two computing threads in computer transaction processes via the strongly connected component by executing a greedy algorithm including:

selecting, by the at least one processor, a victim node, based on a combination of priority of the node and cost based on an amount of log used by an associated task, for removal from the strongly connected component, assuming that the selected node is removed from the strongly connected component, and based at least partly on the assuming, by the at least one processor, estimating a total cost in terms of the removal cost of the selected node plus a cost of removing remaining nodes of strongly connected component;

removing the selected victim node and remaining nodes based on the estimated total cost and resolving the deadlocks.

16. The computer memory of claim 15, further comprising examining the strongly connected component as a whole.

17. The computer memory of claim 16, further comprising traversing the strongly connected component to select the victim node.

18. The computer memory of claim 16, further comprising verifying stability of the wait-for-graph.

19. The computer memory of claim 16, further comprising inferring victim selection via an inference component.

20. The computer memory of claim 16, further comprising employing a Kosaraju algorithm to compute actual remaining SCCs after graph reduction for every cost estimation.

* * * * *